(12) United States Patent
Harvey et al.

(10) Patent No.: US 7,618,060 B2
(45) Date of Patent: Nov. 17, 2009

(54) AIR BAG MODULE WITH AN INTEGRAL SHIELD

(75) Inventors: Jeffrey A. Harvey, Sterling Heights, MI (US); Rickey L. Stratton, Pontiac, MI (US)

(73) Assignee: TRW Vehicle Safety Systems Inc., Washington, MI (US)

( * ) Notice: Subject to any disclaimer, the term of this patent is extended or adjusted under 35 U.S.C. 154(b) by 503 days.

(21) Appl. No.: 11/707,462

(22) Filed: Feb. 19, 2007

(65) Prior Publication Data

US 2007/0222196 A1    Sep. 27, 2007

Related U.S. Application Data

(63) Continuation-in-part of application No. 11/386,488, filed on Mar. 22, 2006, now abandoned.

(51) Int. Cl.
*B60R 21/215* (2006.01)

(52) U.S. Cl. ............ 280/740; 280/729; 280/743.1; 280/728.2

(58) Field of Classification Search ........... 280/740, 280/729, 743.1, 728.2
See application file for complete search history.

(56) References Cited

U.S. PATENT DOCUMENTS

| | | | |
|---|---|---|---|
| 3,937,258 A * | 2/1976 | Loomba ............... 141/67 |
| 4,944,527 A * | 7/1990 | Bishop et al. ............ 280/741 |
| 5,172,933 A | 12/1992 | Strasser | |
| 5,249,824 A * | 10/1993 | Swann et al. ............ 280/729 |
| 5,573,270 A | 11/1996 | Sogi et al. | |
| 5,944,342 A * | 8/1999 | White et al. ............ 280/729 |
| 6,149,192 A | 11/2000 | Swann et al. | |
| 6,155,599 A | 12/2000 | Bowers et al. | |
| 6,336,659 B1 * | 1/2002 | Corrion ............ 280/736 |
| 6,612,609 B1 * | 9/2003 | Rodriguez et al. ........ 280/729 |
| 6,648,366 B2 * | 11/2003 | Dillon et al. ............ 280/729 |
| 6,827,368 B2 * | 12/2004 | Jang et al. ............ 280/729 |
| 2003/0173760 A1 * | 9/2003 | Dillon et al. ............ 280/729 |
| 2005/0052008 A1 * | 3/2005 | Rose et al. ............ 280/740 |
| 2005/0285379 A1 * | 12/2005 | Soderquist ............ 280/740 |
| 2006/0237953 A1 * | 10/2006 | Abe ............ 280/729 |
| 2006/0249932 A1 * | 11/2006 | Marriott ............ 280/729 |

* cited by examiner

*Primary Examiner*—Paul N. Dickson
*Assistant Examiner*—Timothy Wilhelm
(74) *Attorney, Agent, or Firm*—Tarolli, Sundheim, Covell & Tummino LLP (57) ABSTRACT

An apparatus (10) for helping to protect a vehicle occupant includes an inflatable vehicle occupant protection device (12). An inflator (14) provides inflation fluid for inflating the protection device (12). The inflation fluid flow from the inflator (14) is transverse to a central axis (16) of the inflator. A shield (70) includes a piece of material (72) folded about the inflator (14) and having a wall portion (102) that is interposed between at least a portion of the inflator and the protection device (12) and against which inflation fluid initially exiting from the inflator at least partially impinges. The wall portion (102) has a plurality of tear seams (76) that rupture due to inflation fluid pressure acting on the shield (70) to enable the wall portion to form a plurality of flaps (80) within the protection device (12). Each flap (80) moves away from the central axis (16) of the inflator (14) about a respective axis that extends transverse to the central axis (16) of the inflator to block inflation fluid contact with portions of the protection device (12).

22 Claims, 6 Drawing Sheets

Fig.9 though the following description of the invention with reference to the accompanying drawings, in which:

AIR BAG MODULE WITH AN INTEGRAL SHIELD

RELATED APPLICATION

This application is a continuation-in-part of U.S. patent application Ser. No. 11/386,488, which was filed on Mar. 22, 2006 now abandoned.

TECHNICAL FIELD

The present invention relates to an apparatus for helping to protect a vehicle occupant in a vehicle collision and, more particularly, to such an apparatus having an integral shield.

BACKGROUND OF THE INVENTION

Many vehicles have an air bag that inflates to help protect a vehicle occupant when the vehicle is involved in a collision. The air bag is inflated by inflation fluid provided by an air bag inflator. Certain air bag inflators produce inflation fluid by combustion of a pyrotechnic material. Air bag retainers may include deflectors to help direct hot inflation gas away from the air bag.

SUMMARY OF THE INVENTION

The present invention relates to an apparatus for helping to protect a vehicle occupant. The apparatus includes an inflatable vehicle occupant protection device and an inflator for providing inflation fluid to inflate the protection device. The inflation fluid flow from the inflator is transverse to a central axis of the inflator. A shield includes a piece of material folded about the inflator and having a wall portion that is interposed between at least a portion of the inflator and the protection device and against which inflation fluid initially exiting from the inflator at least partially impinges. The wall portion has a plurality of tear seams that rupture due to inflation fluid pressure acting on the shield to enable the wall portion to form a plurality of flaps within the protection device. Each flap moves away from the central axis of the inflator about a respective axis that extends transverse to the central axis of the inflator to block inflation fluid contact with portions of the protection device.

The present invention also relates to an apparatus for helping to protect a vehicle occupant. The apparatus includes an inflatable vehicle occupant protection device. An inflator provides inflation fluid for inflating the protection device. A shield connected to the protection device includes a piece of material having a wall portion and a peripheral edge portion. The wall portion is interposed between at least a portion of the inflator and the protection device. Inflation fluid initially exiting from the inflator impinges against the wall portion. At least a portion of the peripheral edge portion is secured to the protection device at a location spaced apart from the inflator. The shield includes a plurality of tear seams that help define a plurality of flaps in the wall portion. The tear seams are rupturable due to inflation fluid acting on the shield to release the flaps to pivot away from the inflator to help block inflation fluid from contacting portions of the protection device.

The present invention further relates to an apparatus for helping to protect a vehicle occupant. The apparatus includes an inflatable vehicle occupant protection device and an inflator for providing inflation fluid to inflate the protection device. The apparatus also includes a shield comprising a peripheral portion secured to the protection device. The shield includes a wall portion at least partially interposed between the inflator and the protection device, a central opening, and at least one tear seam defining flaps of the shield. The shield directs initial inflation fluid flow from the inflator toward the opening. The tear seams are adapted to rupture due to inflation fluid pressure acting on the shield, which enables the flaps to move against the protection device to at least partially block inflation fluid contact with the protection device.

BRIEF DESCRIPTION OF THE DRAWINGS

The foregoing and other features of the present invention will become apparent to one skilled in the art to which the present invention relates upon consideration of the following description of the invention with reference to the accompanying drawings, in which.

DETAILED DESCRIPTION OF THE INVENTION

The present invention relates to an apparatus which includes an inflatable vehicle occupant protection device, such as an air bag. Other inflatable vehicle occupant protection devices that can be used in accordance with the invention include, for example, inflatable seat belts, inflatable knee bolsters, inflatable head liners, inflatable side curtains, and knee bolsters operated by inflatable air bags.

Figure 1:
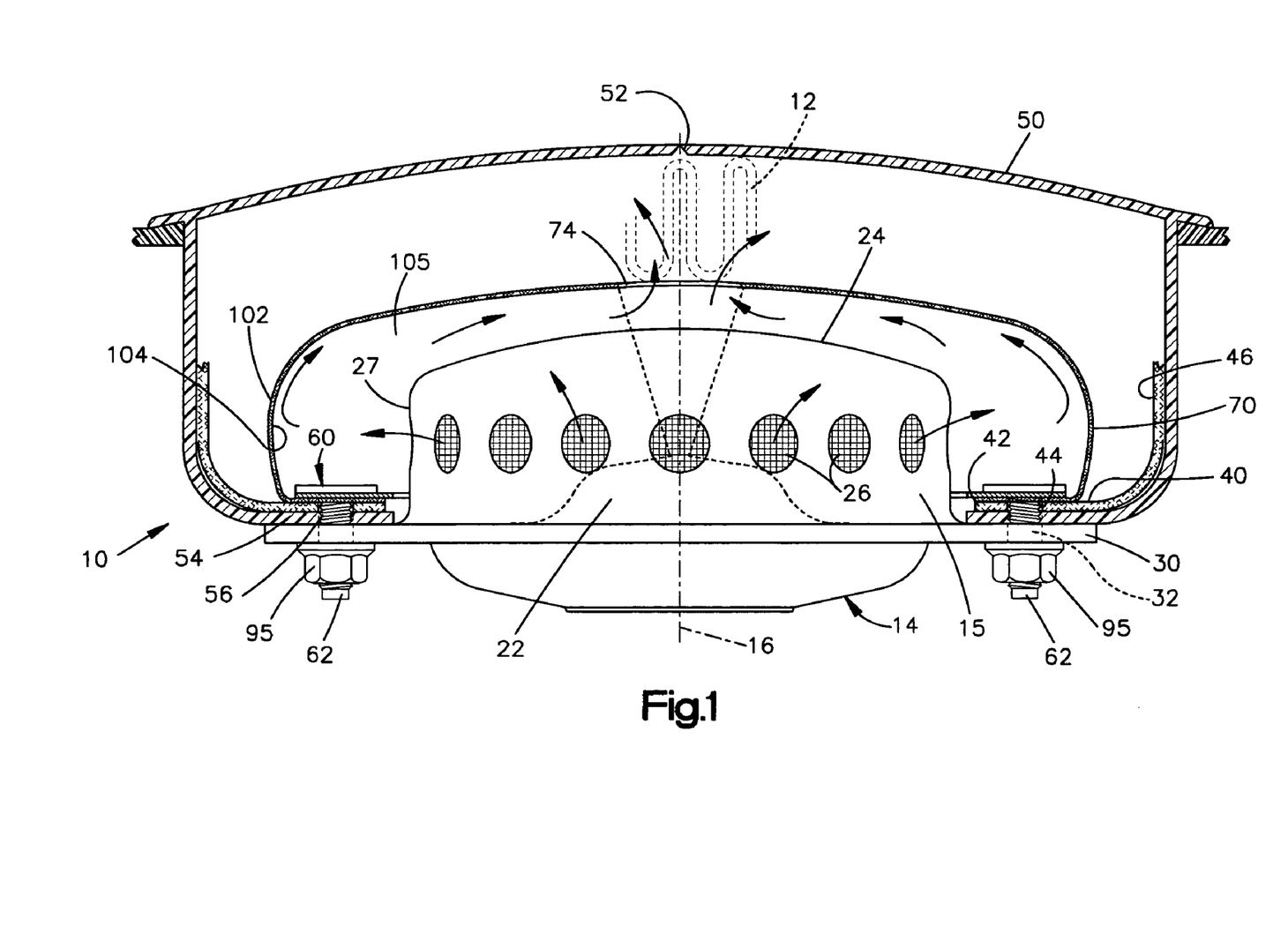
FIG. 1 is a sectional view of an air bag module constructed in accordance with a first embodiment of the present invention.

An apparatus 10 in accordance with a first embodiment of the present invention is shown in FIG. 1. The apparatus 10 includes an air bag 12 and an inflator 14 to inflate the air bag 12. The inflator 14 contains an ignitable gas generating material, which, when ignited, produces a volume of inflation fluid in the form of a gas to inflate the air bag 12. Alternatively, the inflator 14 could contain a stored quantity of pressurized inflation fluid, or could contain a combination of pressurized inflation fluid and ignitable material for heating the pressurized inflation fluid.

The inflator 14 has a central axis 16 and includes cylindrical housing 15. The housing 15 includes a circular upper end wall 24 and an axially extending cylindrical side wall 27. The upper end wall 24 of the housing 15 is domed, that is, has a curved configuration projecting upward (as viewed in the drawings) and inward from the side wall 27. A circumferentially spaced plurality of outlet openings 26 are formed in the side wall 27 of the housing 15 for directing inflation gas out of the inflator 14 in directions extending transverse to the central axis 16.

A mounting flange 30 projects radially outward from a lower end (as viewed in FIG. 1) of the inflator 14. The mounting flange 30 has four circumferentially spaced apart fastener openings 32. Lead wires (not shown) extend from the lower end of the inflator 14 and are electrically connected with electrical circuitry and with a vehicle deceleration sensor for actuating the inflator, as known in the art.

The air bag 12 is made from a fabric material, such as woven nylon. The air bag 12 includes a mouth portion 40, which includes a central opening 42 through which the housing 15 of the inflator 14 extends. Four circumferentially spaced openings 44 are provided in the mouth portion 40 of the air bag 12 and are aligned with the fastener openings 32 of the mounting flange 30. Parts of the main body portion 46 of the air bag 12 are omitted for clarity in FIGS. 1 and 2.

The apparatus 10 also includes a cover 50, which covers the folded air bag 12 and the inflator 14. The cover 50 has a rupturable tear seam 52, which is preferably not visible in the vehicle when the apparatus 10 is mounted in the vehicle. The cover 50 also has a mounting portion 54, which extends radially inward toward the axis 16 at a location between the air bag mouth portion 40 and the inflator mounting flange 30. The mounting portion 54 includes four circumferentially spaced fastener apertures 56.

Figure 4:
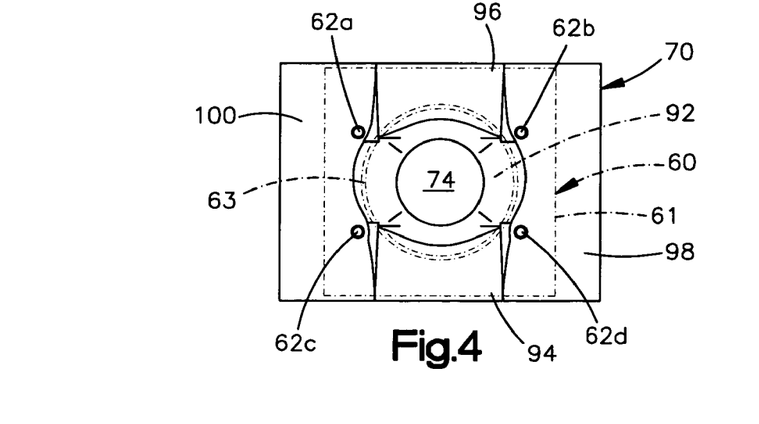
FIG. 4 is a bottom perspective view of the shield of the first embodiment of the present invention in a folded state and associated with an air bag retaining ring.

The apparatus 10 further includes a bag retaining ring 60, which has a circular ring shaped inner portion 63 and a square shaped outer flange portion 61 (FIG. 4). The inner portion 63 is recessed with respect to the outer flange portion 61. The bag retaining ring 60 includes a central opening 92. The bag retaining ring. 60 circumscribes the inflator 14. The retaining ring 60 is made of plastic or any other suitable material. Four steel mounting studs 62 are insert molded on the outer flange portion 61 of the plastic retaining ring 60.

Figure 3:
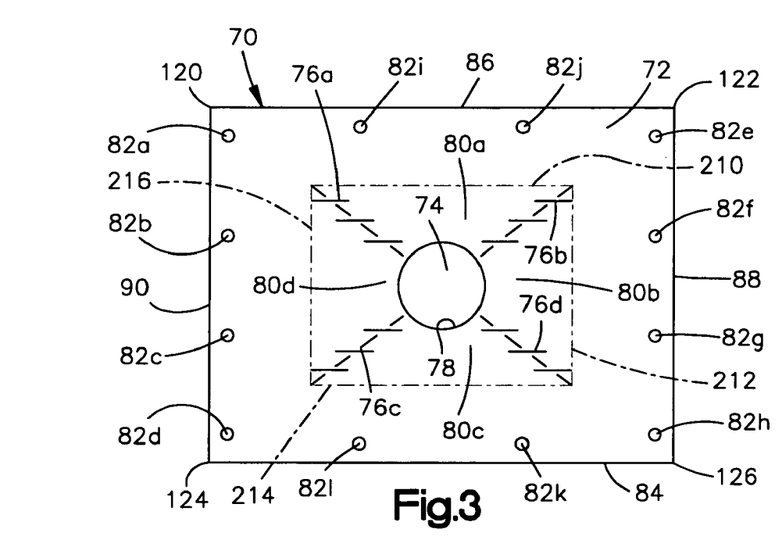
FIG. 3 is a schematic plan view of a panel used to form a shield of the first embodiment of the present invention.

The apparatus 10 further includes a heat shield 70. As best seen in FIG. 3, the heat shield 70 is constructed from a piece 72 of fabric material that is rectangular in shape. The fabric piece 72 may be made of nylon 585 Dtex yarn or thread, or any other material. The fabric piece 72 includes a circular opening 74 that is centrally located in the fabric piece 72. The opening 74 is defined by an edge 78 of the fabric piece 72. The fabric piece 72 further comprises four tear seams 76a-d located equally spaced around the central opening 74.

A first tear seam 76a begins from a location near the edge 78 of the fabric piece 72 and extends away from the opening 74 in a direction towards a rear left corner 120 of the fabric piece 70 as viewed in FIG. 3. A second tear seam 76b begins from a location near the edge 78 of the fabric piece 72 and extends away from the opening 74 in a direction towards a rear right corner 122 of the fabric piece 72. A third tear seam 76c begins from a location near the edge 78 of the fabric piece 72 opposite the second tear seam 76b and extends away from the opening 74 in a direction towards a front left corner 124 of the fabric piece 72. A fourth tear seam 76d begins from a location near the edge 78 of the fabric piece 72 opposite the first tear seam 76a and extends away from the opening 74 in a direction towards a front right corner 126 of the fabric piece 72.

The first and fourth tear seams 76a, 76d are located on a diagonal line extending between the rear left corner 120 and front right corner 126 of the fabric piece 72. The second and third seams 76b, 76c are located on a diagonal line extending between the rear right corner 122 and front left corner 124 of the fabric piece 72. Triangular inner flaps 80a-d of the fabric piece 72 are formed between adjacent tear seams 76a-d. All of the tear seams 76a-d are of equal length. When the tear seams rupture, the inner flaps 80a, 80b, 80c, 80d are allowed to pivot along their respective axes 210, 212, 214, 216. In particular, inner flap 80a is located between tear seams 76a and 76b and can pivot about axis 210. Inner flap 80b is located between tear seams 76b and 76d and can pivot about axis 212. Inner flap 80c is located between tear seams 76c and 76d and can pivot about axis 214. Inner flap 80d is located between tear seams 76a and 76c and can pivot about axis 216. Each of the axes 210, 212, 214, 216 extend in a direction transverse to the central axis 16 of the inflator 14.

A plurality of fastener apertures 82 are provided in the fabric piece 72 near the periphery of the fabric piece 72. The fabric piece 72 has front and rear edges 84, 86, and right and left side edges 88, 90. Four apertures 82a-d are located near the left side edge 90 and are each spaced the same distance from the left side edge 90. The distances between adjacent apertures 82a-d are also equal to one another. Four apertures 82e-h are located near the right side edge 88 and are each spaced the same distance from the right side edge 88. The distances between the adjacent apertures 82e-h are also equal to one another.

Two apertures 82i, 82j are located near the rear edge 86 and are each spaced the same distance from the rear edge 86. Two apertures 82k, 82l are located near the front edge 84 and are each spaced the same distance from the front edge 84.

As seen in FIG. 4, the fabric piece 72 is fastened to the bag retaining ring 60. The central opening 74 of the fabric piece 72 is centered over the inflator 14 and the central opening 92 in the bag retaining ring 60. The central axis 16 of the inflator 14 extends through the central opening 74. The edges 84, 86, 88, 90 of the fabric piece 72 are folded over onto the fabric piece 72 to form respective folded over portions 94, 96, 98, 100, and each folded over portion is secured to adjacent folded over portions. In particular, edges 84 and 86 are first folded over onto the fabric piece 72 to form respective folded over portions 94 and 96. Then, edges 88 and 90 are folded over on the fabric piece 72 to form respective folded over portions 98 and 100. Fold over portion 94 is secured to the front corners of fold over portions 98 and 100, fold over portion 96 is secured to the rear corners of fold over portions 98 and 100, fold over portion 98 is secured to the right corners of fold over portions 94 and 96, fold over portion 100 is secured to the left corners of fold over portions 94 and 96.

The folded over portions 94, 96, 98, 100 are clamped between the mouth portion 40 of the air bag 12 and the bag retaining ring 60. When in this position, fabric piece 72 forms the heat shield 70 for the air bag 12. During the assembling of the apparatus 10, the fabric piece 72 and retaining ring 60 are assembled as a unit as seen in FIG. 4. The studs 62 projecting from the retaining ring 60 extend through the apertures 82 of the folded portions 94, 96, 98, 100. Specifically, a rear left stud 62a extends through the left aperture 82i of the rear edge 86 and the rear apertures 82a, 82b of the left side edge 90. A rear right stud 62b extends through the right aperture 82j of the rear edge 86 and the rear apertures 82e, 82f of the right side edge 88. A front left stud 62c extends through the left aperture 82l of the front edge 84 and the front apertures 82c, 82d of the left side edge 90, and a front right stud 62d extends through the right aperture 82k of the front edge 84 and the front apertures 82g, 82h of the right side edge 88.

The studs 62a-d also extend through the openings 44 of the mouth portion 40 of the air bag 12, the respective apertures 56 in the mounting portion 54 of the cover 50, and fastener openings 32 in the mounting flange 30 of the inflator 14. Nuts 95 screwed onto the studs 62a-d clamp the mouth portion 40 of the air bag 12 between the retaining ring 60 and inflator mounting flange 30 and secure the heat shield 70, the inflator 14, and the air bag 12 in the apparatus 10.

The housing 15 of the inflator extends through the mounting portion 54 of the cover 50 and through the central opening 42 in the mouth portion of the air bag 12. The tear seams 76a-d are spaced apart around the end wall 24 of the housing 15 of the inflator 14. As seen in FIG. 1, the heat shield 70 includes a wall portion 102 that is interposed between the inflator 14 and the air bag 12 and against which gas exiting from the outlets 26 of the inflator 14 initially impinges. The wall portion 102 includes the tears seams 76a-76d and flaps 80a-80d.

Nylon material, such as silicone, is coated on an inner surface 104 of the wall portion 102 facing the inflator 14. The wall portion 102 extends over the inflator 14 and covers the inflation outlets 26. The wall portion 102 is spaced outwardly from the inflator to define a chamber 105 between the inner surface 104 and outer side surface 22 of the housing 15 of the inflator 14 as shown in FIG. 1. The central opening 74 of the heat shield 70 is spaced upwardly adjacent from the upper end wall 24 of the inflator 14. The central opening 74 has a diameter that is smaller than the diameter of the upper end wall 24. Because of this configuration of the inflator 14 and heat shield 70, the inflation gas from the inflator 14 enters the chamber 105 at a faster flow rate than the gas exits the chamber 105 through the central opening 74. As a result, pressure builds up in the chamber 105 until the pressure causes the tear seams 76a-d to rupture.

The vehicle in which the apparatus 10 is mounted includes known electrical means (not shown) for sensing an impact to the vehicle and for actuating the inflator 14 in response to the sensing of an impact. The electrical means may, for example, include a deceleration sensor and vehicle circuitry for electrically actuating the inflator 14 in response to sensing vehicle deceleration greater than a predetermined threshold value for which inflation of the air bag 12 is desired to help protect the vehicle occupant. The electrical means is electrically connected with the inflator 14 for providing an actuation signal to the inflator 14.

In operation, when the inflator 14 is actuated, inflation gas, as indicated by the arrows in FIG. 1, flows out of the inflator 14 through the inflation fluid outlets 26 in the outer side surface 22 of the housing 15 of the inflator 14. The inflation fluid flow from the inflator 14 is transverse to the central axis 16 of the inflator. The inflation gas flows into the chamber 105 and then impinges on the inner surface 104 of the wall portion 102 of the heat shield 70, which diverts the gas away from the air bag 12. The wall portion 102 directs the inflation gas to flow into the air bag 12 through the central opening 74 of the heat shield 70, which reduces the flow rate of the gas.

The difference between the gas flow rate into the chamber 105 and the gas flow rate out of the chamber 105 causes the pressure in the heat shield 70 to increase. The pressure increase and the gas flow against the seams 76a-d cause the seams to rupture or tear, and the triangular flaps 80a, 80b, 80c, 80d to pivot about their respective axes 210, 212, 214, 216 away from the inflator 14 at a predetermined time, e.g., about 5 milliseconds or less, after actuation of the inflator 14.

Figure 2:
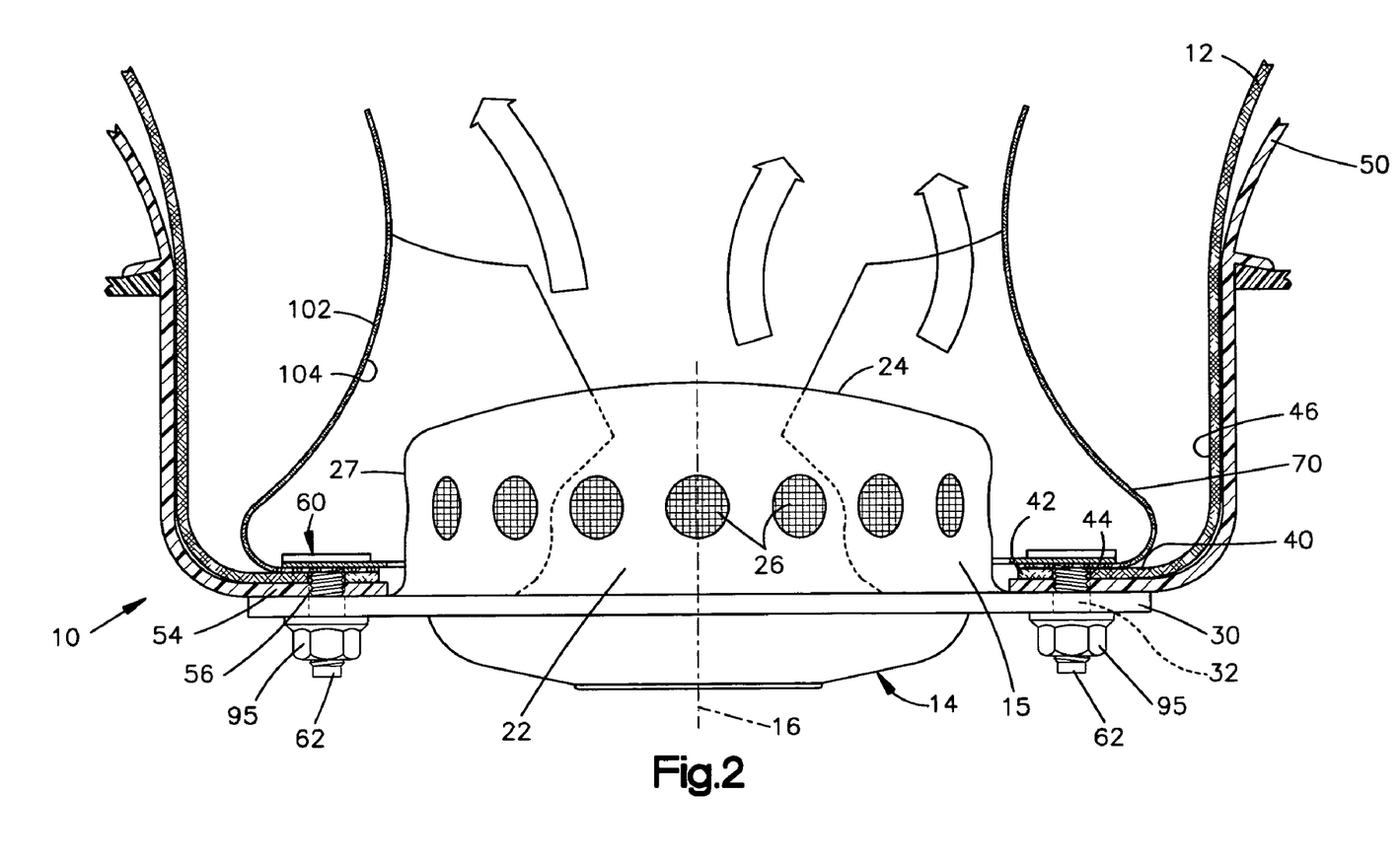
FIG. 2 is a view similar to FIG. 1 showing the air bag module during inflation of the air bag.

As more inflation gas flows from the inflation fluid outlets 26, the inner flaps 80a, 80b, 80c, 80d pivot about their respective axes 110, 112, 114, 116 away from the upper end wall 24 and central axis 16 of the inflator 14 to a position shown in FIG. 2, which allows more inflation gas to flow out of the heat shield 70 to inflate the air bag 12 faster than when the seams 76a-d are not torn. The flaps 80a-d block inflation fluid contact with portions of the air bag 12. As a result, hot particles that may be present in the flow of inflation gas from the inflator 14 tend to contact the shield 70 instead of the air bag 12.

Figure 5:
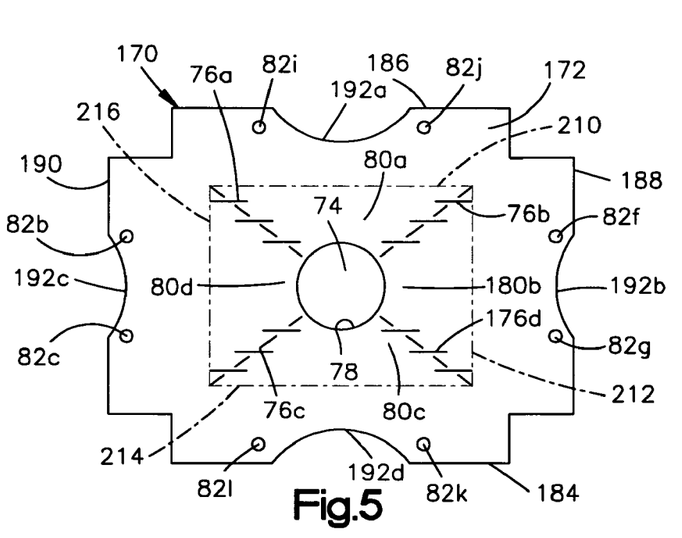
FIG. 5 is a schematic plan view of a panel used to form a shield according to a second embodiment of the present invention.
Figure 6:
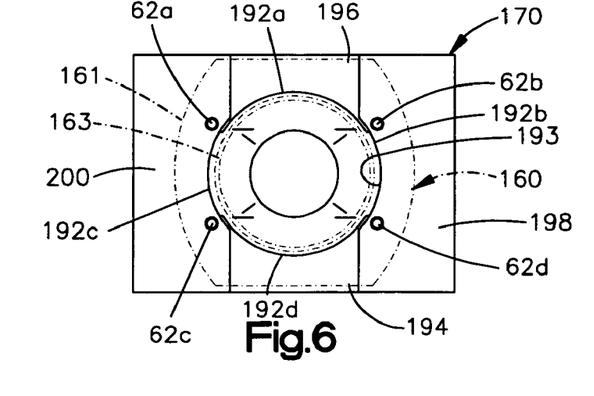
FIG. 6 is a bottom perspective view of the shield of the second embodiment of the present invention in a folded state and fastened to an air bag retaining ring.

FIGS. 5 and 6 show a heat shield 170 and bag retainer 160 of a second embodiment of the present invention. The reference numbers for the elements of the first embodiment are used for similar elements in the second. Elements that are different are given different reference numbers. In the second embodiment, the fabric piece 172 is cross-shaped with the edges 184, 186, 188, 190 having arcuate cut outs 192a-d. As depicted in FIG. 6, the cut outs 192a-d together define a circular opening 193 when the edges of the fabric piece 172 are folded over to form the folded portions 194, 196, 198, 200. The circular opening 193 is sized to fit around the cylindrical side wall 27 of the inflator 12.

In this embodiment, the apertures 82i, 82j are located at opposite ends of the cut out portion 192a of the rear edge 186. The apertures 82f, 82g are located at opposite ends of the cut out portion 192b of the right side edge 188. The apertures 82l, 82k are located at opposite ends of the cut out portion 192d of the front edge 184. The apertures 82b, 82c are located at opposite ends of the cut out portion 192c of the left side edge 190. Adjacent apertures in different edges are aligned with each other when the edges 184, 186, 188, 190 are folded over to form the folded portions 194, 196, 198, 200 as seen in FIG. 6. In particular, apertures 82b and 82i are aligned with each other, apertures 82j and 82f are aligned with each other, apertures 82g and 82k are aligned with each other, and apertures 82l and 82c are aligned with each other when the edges 184, 186, 188, 190 are folded over to form the folded portions 194, 196, 198, 200.

The bag retaining ring 160 includes a circular inner lip portion 163 and a barrel shaped flange portion 161. The inner lip portion 163 extends upwardly from the flange portion 161. The bag retaining ring 160 circumscribes the inflator 14. The retaining ring 160 is made of plastic or any other suitable material. The four steel mounting studs 62 are insert molded on the outer flange portion 161 of the retaining ring 160. The other elements and their operation in this second embodiment is the same as that of the first embodiment.

Figure 7:
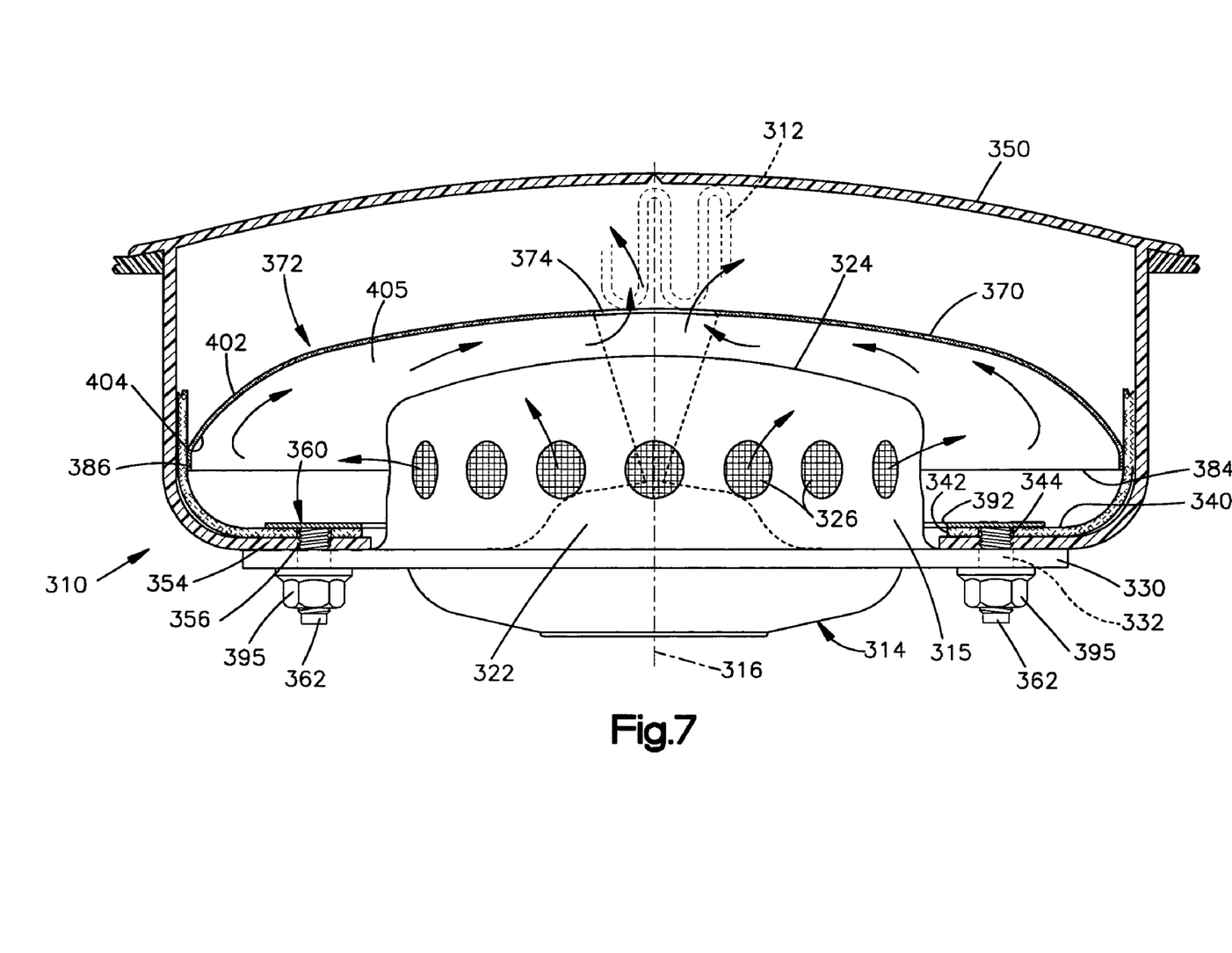
FIG. 7 is a sectional view of an air bag module constructed in accordance with a third embodiment of the present invention.
Figure 8:
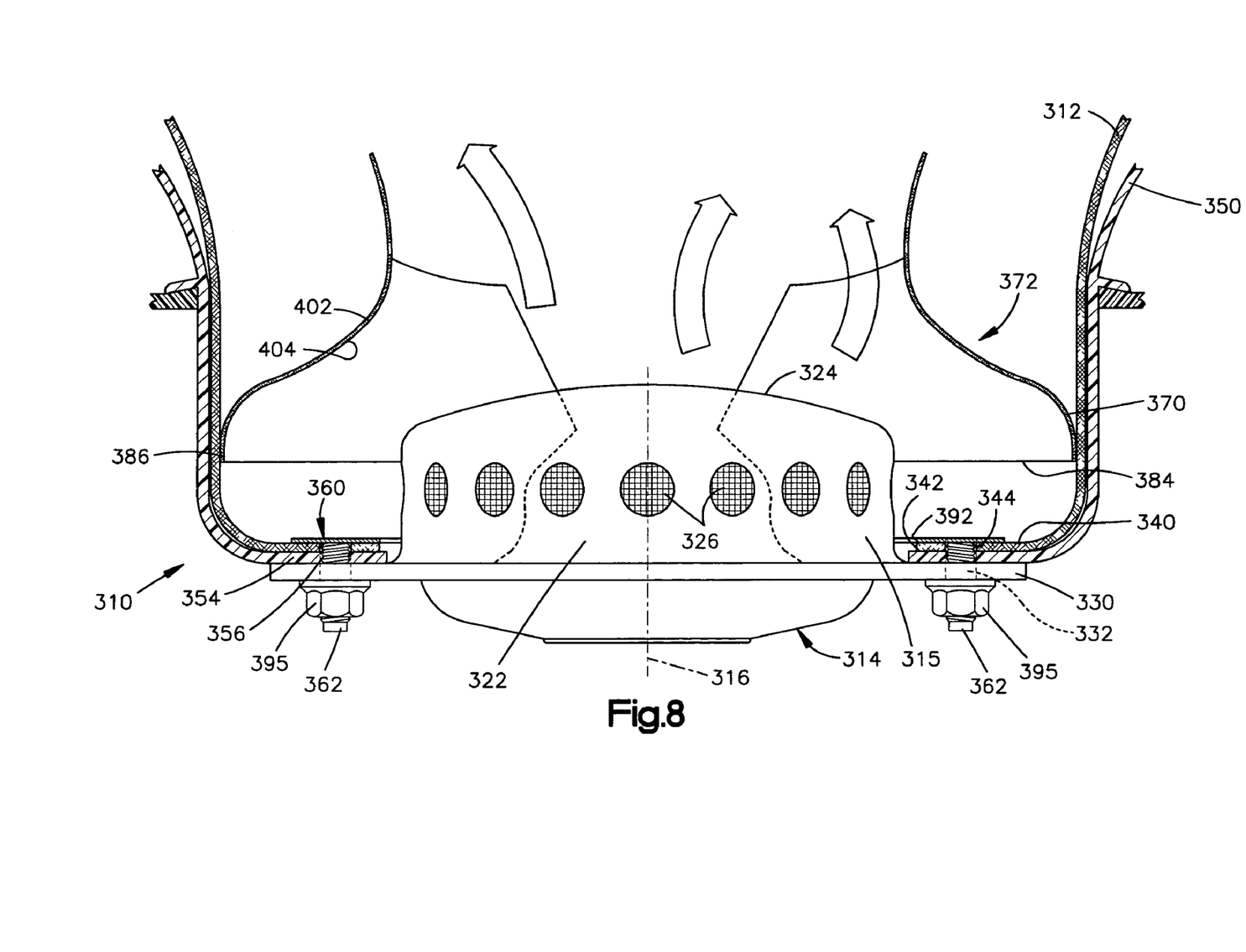
FIG. 8 is a view similar to FIG. 7 showing the air bag module during inflation of the air bag.
Figure 9:
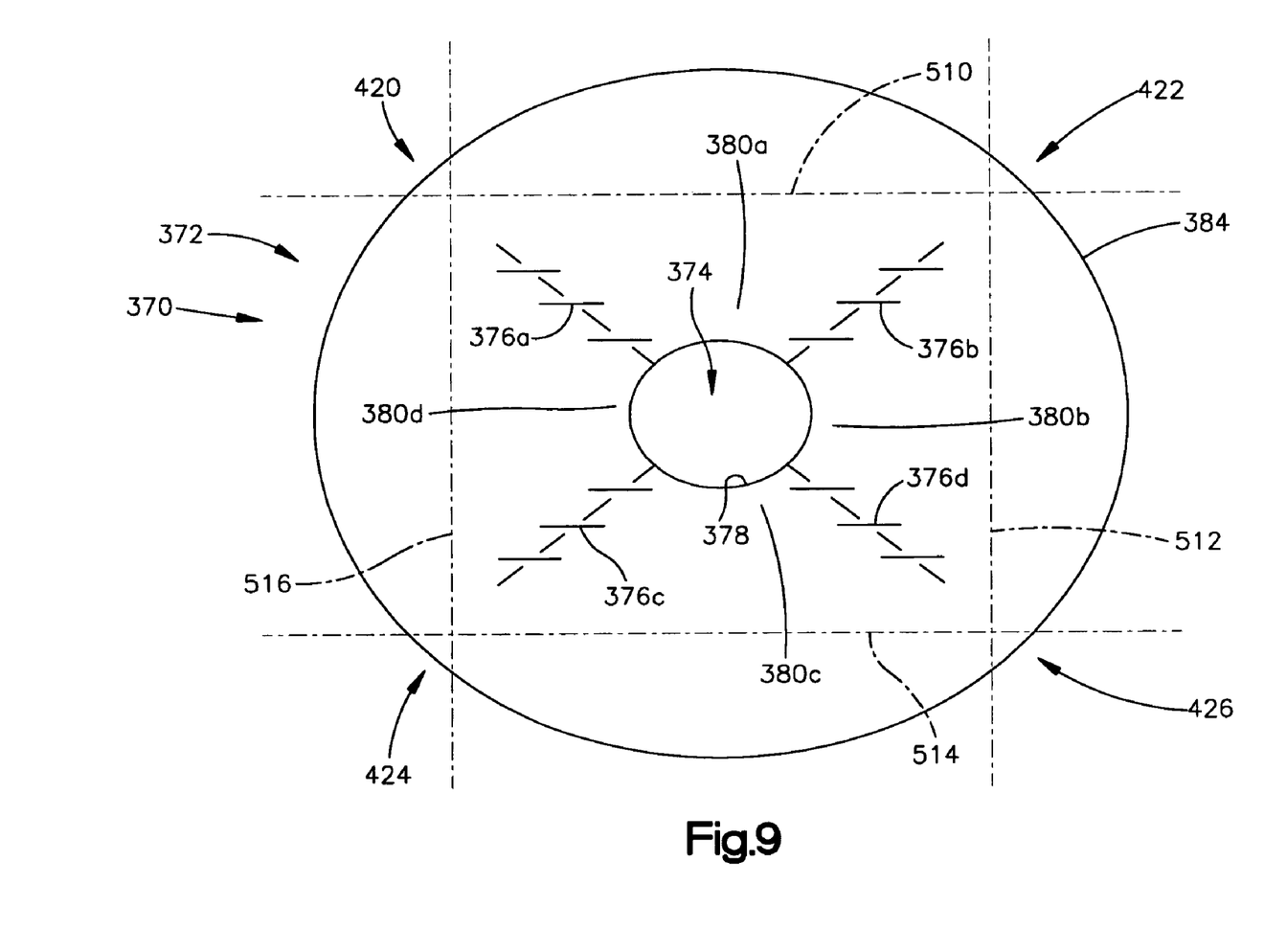
FIG. 9 is a schematic plan view of a panel used to form a shield of the third embodiment of the present invention.

An apparatus in accordance with a third embodiment of the present invention is illustrated in FIGS. 7-9. The apparatus 310 of the third embodiment is similar to the embodiments of FIGS. 1-6, except that the heat shield of the third embodiment is secured to the apparatus 310 in a manner different than that used to secure the heat shield in the first and second embodiments. Other components of the apparatus 310, such as the air bag 312, inflator 314, cover 350, and retaining ring 360, may be identical to those of the embodiments of FIGS. 1-6.

Referring to FIGS. 7 and 8, the apparatus 310 includes a heat shield 370 that is secured to the air bag 312 in a manner described below in further detail. As best seen in FIG. 9, the heat shield 370 is constructed from a piece 372 of fabric material that is rounded (e.g., oval, circular, or curvilinear) in shape. The fabric piece 372 may be made of nylon 585 Dtex thread or yarn. The fabric piece 372 includes a circular opening 374 that is centrally located in the fabric piece and a periphery 384 that is spaced from the opening. The opening 374 is defined by an edge 378 of the fabric piece 372. The fabric piece 372 further comprises a plurality of radially extending tear seams, such as the four tear seams 376a-d shown in FIG. 9, that are located equally spaced around the central opening 374.

A first tear seam 376a extends from a location intersecting or near the edge 378 of the fabric piece. 372 toward a rear left section 420 of the fabric piece as viewed in FIG. 9. A second tear seam 376b extends from a location intersecting or near the edge 378 of the fabric piece 372 toward a rear right section 422 of the fabric piece. A third tear seam 376c extends from a location intersecting or near the edge 378 of the fabric piece 372 toward a front left section 424 of the fabric piece. A fourth tear seam 376d extends from a location intersecting or near the edge 378 of the fabric piece 372 toward a front right section 426 of the fabric piece.

The first and fourth tear seams 376a, 376d are located on a diagonal line extending between the rear left section 420 and front right section 426 of the fabric piece 372. The second and third seams 376b, 376c are located on a diagonal line extending between the rear right section 422 and front left section 424 of the fabric piece 372. Triangular inner flaps 380a-d of the fabric piece 372 are formed between adjacent tear seams 376a-d. All of the tear seams 376a-d are of equal length. When the tear seams rupture, the inner flaps 380a, 380b, 380c, 380d are allowed to pivot about respective axes 510, 512, 514, 516. In particular, inner flap 380a is located between tear seams 376a and 376b and can pivot about axis 510. Inner flap 380b is located between tear seams 376b and 376d and can pivot about axis 512. Inner flap 380c is located between tear seams 376c and 376d and can pivot about axis 514. Inner flap 380d is located between tear seams 376a and 376c and can pivot about axis 516. Each of the axes 510, 512, 514, 516 extend in a direction transverse to the central axis 316 of the inflator 314.

As seen in FIGS. 7 and 8, the fabric piece 372 is fastened to the air bag 312. The central opening 374 of the fabric piece 372 is centered over the inflator 314 and the central opening 392 in the bag retaining ring 360. The central axis 316 of the inflator 314 extends through the central opening 374. A periphery or peripheral edge portion 384 of the fabric piece 372 is secured to the air bag 312 at secured connection 386. The secured connection 386 is only labeled at one location on FIGS. 7 and 8, but extends substantially around the periphery 384 or other portion of the fabric piece 372. By "secured", what is meant is that the fabric piece 372 is sewn, bonded, heat-welded, chemically or mechanically adhered, or otherwise attached, continuously or discontinuously, to the air bag 312. The shield 370 may be secured to the air bag 312 at a location spaced apart from the inflator 314, as shown in FIGS. 7 and 8, or the secured connection 386 may be located adjacent the inflator 314 (not shown). When the secured connection 386 is spaced apart from the inflator 314, the shield 370 may be interposed only partially between the inflator 314 and the air bag 312, with the inflator 314 and air bag 312 in direct fluid communication in the area between the secured connection 386 and the inflator 314, as shown in FIGS. 7 and 8.

During assembly of the apparatus 310, the fabric piece 372 and air bag 312 may be assembled as a unit, as seen in FIG. 7. Studs 362 extend through openings 344 in the mouth portion 340 of the air bag 312, respective apertures 356 in a mounting portion 354 of the cover 350, and fastener openings 332 in a mounting flange 330 of the inflator 314. Nuts 395 screwed onto the studs 362 clamp the mouth portion 340 of the air bag 312 between the retaining ring 360 and inflator mounting flange 330 and secure the inflator 314 and the air bag 312, with the attached heat shield 370, in the apparatus 310.

The housing 315 of the inflator extends through the mounting portion 354 of the cover 350 and through the central opening 342 in the mouth portion of the air bag 312. The tear seams 376a-d (FIG. 9) are spaced apart around an end wall 324 of the housing 315 of the inflator 314. As seen in FIG. 1, the heat shield 370 includes a wall portion 402 that is at least partially interposed between the inflator 314 and the air bag 312 and against which gas exiting from outlets 326 in the inflator 314 initially at least partially impinges. The wall portion 402 includes the tear seams 376a-376d and flaps 380a-380d.

Silicone material may be coated on an inner surface 404 of the wall portion 402 facing the inflator 314. The wall portion 402 extends over the inflator 314 and at least partially covers the inflation outlets 326 from fluid communication with the air bag 312. The wall portion 402 is spaced outwardly from the inflator to define a chamber 405 between the inner surface 404, air bag 312, and the outer side surface 322 of the housing 315 of the inflator 314 as shown in FIG. 7 (the relative spacing of the components shown is exaggerated for purposes of illustration). The central opening 374 of the heat shield 370 may be spaced upwardly from the upper end wall 324 of the inflator 314. The central opening 374 has a diameter that is smaller than the diameter of the upper end wall 324. Because of this configuration of the inflator 314 and heat shield 370, the inflation gas from the inflator 314 enters the chamber 405 at a higher flow rate than the gas exits the chamber 405 through the central opening 374. As a result, pressure builds up in the chamber 405 until the pressure causes the tear seams 376a-d to rupture.

In operation, when the inflator 314 is actuated, inflation gas, as indicated by the arrows in FIG. 7, flows out of the inflator 314 through the inflation fluid outlets 226 in an outer side surface 222 of the housing 315 of the inflator 314. The inflation fluid flow from the inflator 314 is transverse to the central axis 316 of the inflator. The inflation gas flows into the chamber 405 and then impinges on either the air bag 312 or the inner surface 404 of the wall portion 402 of the heat shield 370, either of which diverts the gas toward the central opening 374. Due to the dimensions of the central opening 374 of the heat shield 370, the flow rate of the gas into the air bag 312 beyond the heat shield is reduced.

The differential between the gas flow rate into the chamber 405 and the gas flow rate out of the chamber 405 causes the pressure on the heat shield 370 to increase. The pressure increase and the gas flow against the seams 376a-d cause the seams to rupture or tear, and the triangular flaps 380a, 380b, 380c, 380d to pivot about their respective axes 510, 512, 514, 516 away from the inflator 314 at a predetermined time after actuation of the inflator 314. This predetermined time may, for example, be about 5 milliseconds or less.

As more inflation gas flows from the inflation fluid outlets 326, the inner flaps 380a, 380b, 380c, 380d pivot about their respective axes 510, 512, 514, 516 away from the upper end wall 324 and central axis 316 of the inflator 314 to a position shown in FIG. 8. This allows more inflation gas to flow out of the heat shield 370 to inflate the air bag 312 faster than when the seams 376a-d are not torn. The flaps 380a-d block inflation fluid contact with portions of the air bag 312. As a result, hot particles that may be present in the flow of inflation gas from the inflator 314 tend to contact the shield 370 instead of the air bag 312.

From the above description of the invention, those skilled in the art will perceive improvements, changes and modifications. Such improvements, changes and modifications within the skill of the art are intended to be covered by the appended claims.

Having described the invention, the following is claimed:

1. An apparatus for helping to protect a vehicle occupant, the apparatus comprising:
   an inflatable vehicle occupant protection device;
   an inflator for providing inflation fluid to inflate the protection device, the inflation fluid flow from the inflator being transverse to a central axis of the inflator; and a shield comprising a piece of material folded about the inflator and having a wall portion interposed between at least a portion of the inflator and the protection device and against which inflation fluid initially exiting from the inflator is directed;

the wall portion having a plurality of tear seams that rupture due to inflation fluid pressure acting on the shield to enable the wall portion to form a plurality of flaps within the protection device, each flap moving away from the central axis of the inflator about a respective axis that extends in a direction transverse to the central axis of the inflator to block inflation fluid contact with portions of the protection device.

2. The apparatus recited in claim 1, wherein the shield is secured to the protection device.

3. The apparatus recited in claim 2, wherein the shield is sewn to the inflatable vehicle occupant protection device at a location spaced apart from the inflator.

4. The apparatus recited in claim 1, wherein the shield comprises an opening located in the piece of material, the inflator having an end adjacent the opening, the central axis of the inflator extending through the opening, the inflation fluid initially exiting from the inflator being diverted by the shield through the opening into the protection device.

5. The apparatus recited in claim 4, wherein the plurality of tear seams are four in number and are located equally spaced around the opening, and four flaps are formed when the plurality of tear seams rupture.

6. The apparatus recited in claim 1, wherein the inflator includes an end wall and a cylindrical side wall, the shield being interposed between at least a portion of the protection device and the end wall and the side wall.

7. The apparatus recited in claim 6, wherein the plurality of tear seams of the shield are spaced apart around the end wall of the inflator.

8. An apparatus as defined in claim 1, wherein said piece of material has its opposite edges folded over onto the piece of material and each folded over portion is secured to the adjacent folded over portions.

9. An apparatus as defined in claim 8, further comprising a plurality of fasteners that extend through said inflatable vehicle occupant protection device and said folded over portions to secure said shield and said inflatable vehicle occupant protection device in said apparatus.

10. An apparatus as defined in claim 1, wherein said inflator includes an end wall and a cylindrical side wall, said shield being interposed between said inflatable vehicle occupant protection device and said end wall and said side wall.

11. An apparatus for helping to protect a vehicle occupant, the apparatus comprising:

an inflatable vehicle occupant protection device;

an inflator for providing inflation fluid to inflate the protection device; and a shield comprising a piece of material having a wall portion and a peripheral edge portion, the wall portion interposed between at least a portion of the inflator and the protection device and against which inflation fluid initially exiting from the inflator impinges, at least a portion of the peripheral edge portion being secured to the protection device at a location spaced apart from the inflator;

the shield comprising a plurality of tear seams that help define a plurality of flaps in the wall portion, the tear seams being rupturable due to inflation fluid acting on the shield to release the plurality of flaps to move away from the inflator to help block inflation fluid from contacting portions of the protection device.

12. The apparatus recited in claim 11, wherein the inflator has a central axis, and each of the plurality of flaps moves away from the central axis of the inflator about a respective axis that extends transverse to the central axis of the inflator.

13. The apparatus recited in claim 11, wherein the plurality of tear seams are four in number and are located equally spaced around the inflator, and four flaps are formed when the plurality of tear seams rupture.

14. The apparatus recited in claim 11, wherein the entire peripheral edge portion of the shield is secured to the protection device.

15. The apparatus recited in claim 11, wherein the shield is free from connection to portions of the apparatus other than the protection device.

16. The apparatus recited in claim 11, wherein the shield comprises an opening in the piece of material, the inflator having an end adjacent the opening, the inflation fluid initially exiting from the inflator being diverted by the shield through the opening into the protection device.

17. The apparatus recited in claim 11, wherein the peripheral edge portion is sewn to the protection device.

18. The apparatus recited in claim 11, wherein the inflator includes an end wall and a cylindrical side wall, the shield being interposed between at least a portion of the protection device and the end wall and the side wall.

19. The apparatus recited in claim 11, wherein the tear seams are arranged to extend radially thus giving the flaps a generally triangular configuration.

20. An apparatus for helping to protect a vehicle occupant, the apparatus comprising:

an inflatable vehicle occupant protection device;

an inflator for providing inflation fluid to inflate the protection device; and a shield comprising:

a peripheral portion secured to the protection device;

a wall portion at least partially interposed between the inflator and the protection device;

a central opening; and at least one tear seam defining a flap of the shield;

the shield directing initial inflation fluid flow from the inflator toward the opening, the tear seam being adapted to rupture due to inflation fluid pressure acting on the shield, rupture of the tear seam enabling the flap to move against the protection device to at least partially block inflation fluid contact with the protection device.

21. The apparatus recited in claim 20, wherein the tear seam extends radially from adjacent or near an edge defining the central opening.

22. The apparatus recited in claim 20, wherein the shield is sewn to the protection device.

* * * * *